United States Patent
Sandstrom

(10) Patent No.: US 9,152,606 B2
(45) Date of Patent: Oct. 6, 2015

(54) TASK SWITCHING AND INTER-TASK COMMUNICATIONS FOR MULTI-CORE PROCESSORS

(71) Applicant: Mark Henrik Sandstrom, Jersey City, NJ (US)

(72) Inventor: Mark Henrik Sandstrom, Jersey City, NJ (US)

(73) Assignee: THROUGHPUTER, INC., Jersey City, NJ (US)

( * ) Notice: Subject to any disclaimer, the term of this patent is extended or adjusted under 35 U.S.C. 154(b) by 281 days.

(21) Appl. No.: 14/016,698

(22) Filed: Sep. 3, 2013

(65) Prior Publication Data

US 2014/0075154 A1 Mar. 13, 2014

Related U.S. Application Data

(62) Division of application No. 13/277,739, filed on Nov. 21, 2011, now Pat. No. 8,561,078.

(51) Int. Cl.
| | |
|---|---|
| *G06F 9/46* | (2006.01) |
| *H04J 3/04* | (2006.01) |
| *G06F 3/00* | (2006.01) |
| *G06F 15/80* | (2006.01) |
| *G06F 9/50* | (2006.01) |

(52) U.S. Cl.
CPC .............. *G06F 15/80* (2013.01); *G06F 9/5027* (2013.01); *G06F 2209/483* (2013.01)

(58) Field of Classification Search
None
See application file for complete search history.

(56) References Cited

U.S. PATENT DOCUMENTS

| | | | |
|---|---|---|---|
| 7,110,417 B1* | 9/2006 | El-Hennawey | G06F 15/17 370/437 |
| 2005/0193186 A1* | 9/2005 | Gazsi et al. | 712/228 |
| 2005/0198476 A1* | 9/2005 | Gazsi | G06F 9/3851 712/228 |
| 2008/0256339 A1* | 10/2008 | Xu et al. | 712/216 |
| 2012/0089985 A1* | 4/2012 | Adar et al. | 718/103 |

* cited by examiner

*Primary Examiner* — Adam Lee

(57) ABSTRACT

The invention provides hardware based techniques for switching processing tasks of software programs for execution on a multi-core processor. Invented techniques involve a hardware logic based controller for assigning, adaptive to program processing loads, tasks for processing by cores of a multi-core fabric as well as configuring a set of multiplexers to appropriately interconnect cores of the fabric and program task specific segments at fabric memories, to arrange efficient inter-task communication as well as transferring of activating and de-activating task memory images among the multi-core fabric. The invention thereby provides an efficient, hardware-automated runtime operating system for multi-core processors, minimizing any need to use processing capacity of the cores for traditional operating system software functions. Additionally, such low overhead hardware based operating system for multi-core processors provides significant cost-efficiency and performance advantages, including data processing throughput maximization across all programs dynamically sharing a given multi-core processor, and hardware based security.

9 Claims, 7 Drawing Sheets

TASK SWITCHING AND INTER-TASK COMMUNICATIONS FOR MULTI-CORE PROCESSORS

CROSS-REFERENCE TO RELATED APPLICATIONS

This application is a divisional of U.S. Utility application Ser. No. 13/277,739, filing date Nov. 21, 2011, now allowed, which claims the benefit of [1] U.S. Provisional Application No. 61/539,616 filed Sep. 27, 2011, each of which is incorporated by reference in its entirety. This application is also related to the following: [2] U.S. Utility application Ser. No. 13/270,194, filed Oct. 10, 2011; [3] U.S. Utility application Ser. No. 13/184,028, filed Jul. 15, 2011; and [4] U.S. Provisional Application No. 61/476,268, filed Apr. 16, 2011, each of which is incorporated by reference in its entirety.

BACKGROUND

1. Technical Field

This invention pertains to the field of digital data processing, particularly to the field of techniques for maximizing data processing throughput across a set of data processing programs dynamically sharing a data processing system comprising multiple processing cores.

2. Descriptions of the Related Art

Computing systems will increasingly be based on multiple processing cores, even in case of traditional single-user devices such as personal computers (PCs), tablet PCs, mobile phones, communicators etc, as well as in higher capacity server type computers. Single software applications will accordingly increasingly be executing on multiple such processing cores in parallel, while the computing hardware (comprising multiple processing cores) will be shared by a number of software applications, some of which may belong to different users. As a result, the set of application program processing tasks running on the set of cores of a given multi-core based computer will need to be updated, potentially highly frequently, in order to pursue sufficiently high application program level as well as system wide processing throughput. To enable such dynamic updating of processing tasks for the set of processing cores, innovations are needed to support efficiently transferring the processing context (e.g. latest state of processing data and interim results, and possibly instructions) of any given task to any core of the system, as well as to support efficient communication among the tasks of an application program running on the multi-core data processing system. Particular challenges to be solved include achieving cost-efficient scalability of such inter-core and inter-task information exchange networks as the number of cores and processing applications and their tasks continuous to grow, while supporting restriction-free, dynamically optimized allocation and assignment of the system processing resources among tasks of the programs configured for a given multi-core processor, to enable high efficiency of system resource usage under varying processing loads presented by the application programs and their tasks.

SUMMARY

The invention provides efficient hardware based techniques for switching data processing tasks of software programs for parallel execution on cores of a multi-core processor. The invented processes, methods and systems involve a hardware logic based controller for repeatedly i) allocating cores of a multi-core processing fabric among programs configured to dynamically share a given multi-core processor, ii) according to such allocating, assigning tasks of the programs for processing by the cores of the fabric and iii) according to such assigning, configuring a set of multiplexers to appropriately connect memories of cores of the multi-core fabric and program task specific segments at the fabric memories, thereby arranging efficient transferring of activating and de-activating task memory images among the multi-core fabric as well as inter-task communication among any program running on the multi-core processor.

An aspect of the invention provides a multi-core data processing system comprising i) an array of processing cores for processing a set of software programs that each comprise their respective priority-ordered lists of tasks to be processed, ii) a hardware logic based controller for repeatedly allocating and assigning cores of the array to process tasks of the programs, iii) a memory providing program task specific memory segments, and iv) a hardware logic based cross-connect for transferring, at least in part based on configuration from the controller, task memory images between cores of the array and the task specific memory segments. Various embodiments of such multi-core data processing systems further include various combinations of additional features, such as features whereby a) the configuration from the controller for the cross-connect comprises an identification of either or both of: a core within the array that is assigned to process a given task of a given program, and a program task that is mapped to a given core within the array for processing, b) the cross-connect comprises a set of multiplexers for connecting memory access buses between the cores of the array and the task specific memory segments, c) the controller configures at least one given multiplexer among a set of task-specific multiplexers at the cross-connect to connect one of the cores of the array to the task-specific memory segment associated with the given multiplexer, or d) the controller configures at least one given multiplexer among a set of core-specific multiplexers at the cross-connect to connect one of the task-specific memory segments to the core of the array associated with the given multiplexer.

Another aspect of the invention provides a method for dynamically switching processing tasks of a set of software programs for an array of processing cores of a data processing platform. According to an embodiment of the invention, such a method comprises i) by a hardware logic based controller, repeatedly assigning tasks from the set of the processing tasks for cores of the array to process, and ii) transferring, at least in part by under control by the controller, task memory images between the cores of the array and task-specific memory segments. Various embodiments of such methods further include various combinations of further steps and features such as those whereby: a) the transferring of task memory images is through a set of multiplexers for connecting memory access buses between the cores of the array and the task-specific memory segments, b) the assigning produces an identification, for at least one given multiplexer among a set of task-specific multiplexers, of an appropriate source core among the array from memory of which to transfer a task memory image to the task-specific memory segment associated with the given multiplexer, c) the assigning produces an identification, for at least one given multiplexer among a set of core-specific multiplexers, of an appropriate source task-specific memory segment from which to transfer a task memory image to the memory of the core of the array associated with the given multiplexer, d) the controller performs its assigning at least in part based on demands for cores within the array by one or more software programs configured to run on the platform, e) the controller performs its assigning at least in part based on indicators, by one or more of the software programs, expressing how many cores of the array a given program is presently demanding, f) the controller performs its assigning following a change in: a capacity demand indicator of at least one of the software programs, a task priority list of at least one of the software programs, and/or allocation of cores of the array among the software programs, g) the controller performs its assigning so that one task gets assigned per each core, or h) the controller performs its assigning periodically, once in a specified amount of time units.

A further aspect of the invention provides a digital hardware logic system for exchanging information between memories at a multi-core data processing fabric that comprises an array of processing cores for processing a set of data processing tasks of a group of software programs and a set of task-specific memory segments at a fabric memory. In an embodiment of the invention, such a system comprises i) task specific multiplexers, each of which is specific to one of the task-specific segments at the fabric memory, as well as ii) core specific multiplexers, each of which is specific to one of the cores of the array, wherein a hardware logic based controller, which repeatedly assigns individual cores of the array to process individual tasks of said set, provides input selection configuration for the task as well as core specific multiplexers. Various embodiments of such systems further include various combinations of additional features, such as features by which: a) the configuration provided by the controller for the task-specific multiplexers comprises an identification of the target core within the array assigned to process any given program task, b) the configuration from the controller for the core-specific multiplexers comprises an identification of the program task that is mapped to any given core of the array for processing, c) the system is used for transferring memory images of program tasks between memories of cores within the array and the program task specific fabric memory segments, or d) the system is used for inter-task communication among at least some of the program tasks.

Aspects and embodiments of the invention as described herein can thus be considered to provide an efficient, hardware-automated runtime operating system for multi-core processors, such that, among its other benefits, minimizes, and in case of certain scenarios, eliminates, the need to consume user application processing time of the cores for traditional operating system software functions. Additionally, such hardware logic based, minimized overhead operating system for multi-core data processing platforms provides significant cost-efficiency and performance advantages, including: demand driven realtime optimization of system resource allocation among programs sharing the platform together with deterministic minimum system capacity access levels for each such program, leading to maximization of achievable data processing throughput, per unit cost, for each program dynamically sharing the system; improved system throughput capacity scalability through resource efficient multi-core processing fabric architecture supporting high performance, restriction free switching of processing tasks for cores of the platform as well as inter-task communication; and straightforward data processing security for user applications dynamically sharing such multi-core data processing platforms, due to the capabilities to disable undesired interferences among programs and tasks configured to run on the platform already at the hardware resource level.

DETAILED DESCRIPTION

Figure 1:
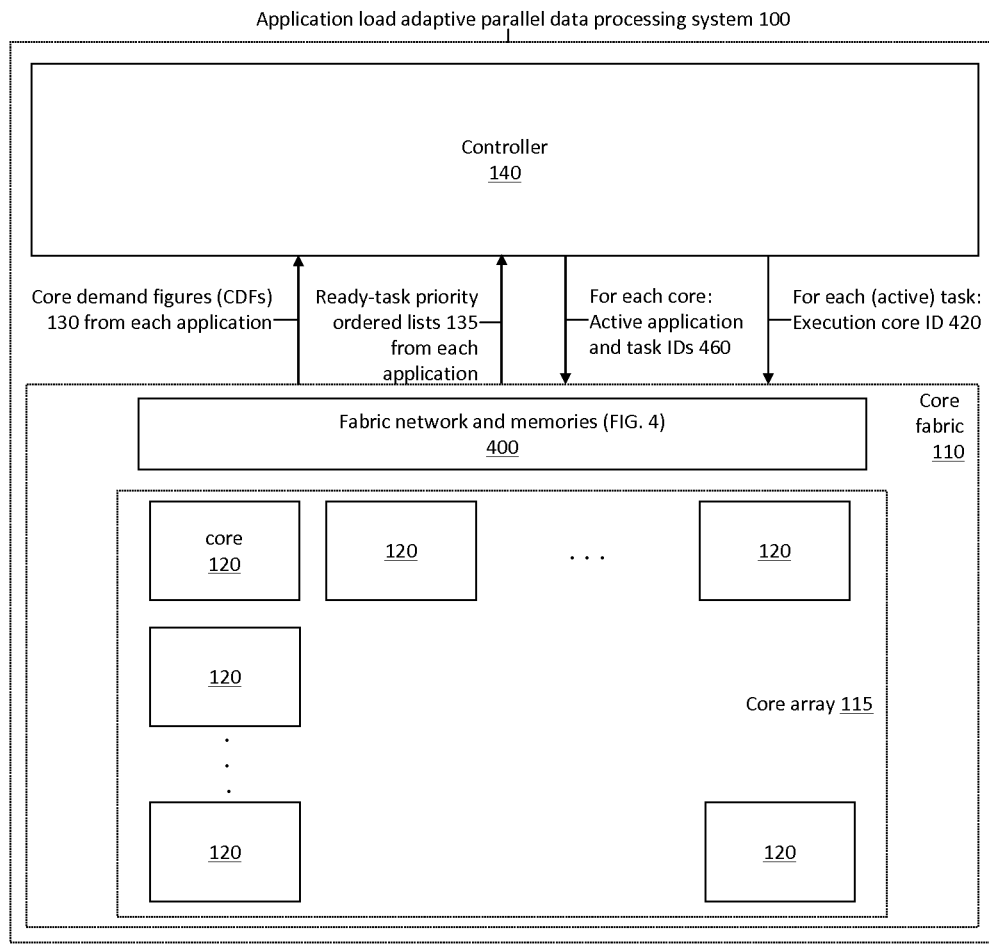
FIG. 1 shows, in accordance with an embodiment of the invention, a functional block diagram for an application program load adaptive parallel data processing system, comprising a multi-core fabric, member cores of which are dynamically space and time shared among processing tasks of a set of software programs, wherein such tasks communicate with each other, as well as have their memory images transferred between working and backup memories of the system, through an efficient on-chip network on the multi-core fabric.

The invention is described herein in further detail by illustrating the novel concepts in reference to the drawings.

General symbols and notations used in the drawings:

Boxes indicate a functional digital logic module; unless otherwise specified for a particular embodiment, such modules may comprise both software and hardware logic functionality.

Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.

A dotted line marks a border of a group of drawn elements that form a logical entity with internal hierarchy, such as the modules constituting the multi-core processing fabric 110 in FIG. 1.

Lines or arrows crossing in the drawings are decoupled unless otherwise marked.

For clarity of the drawings, generally present signals for typical digital logic operation, such as clock signals, or enable, address and data bit components of write or read access buses, are not shown in the drawings.

Figure 2:
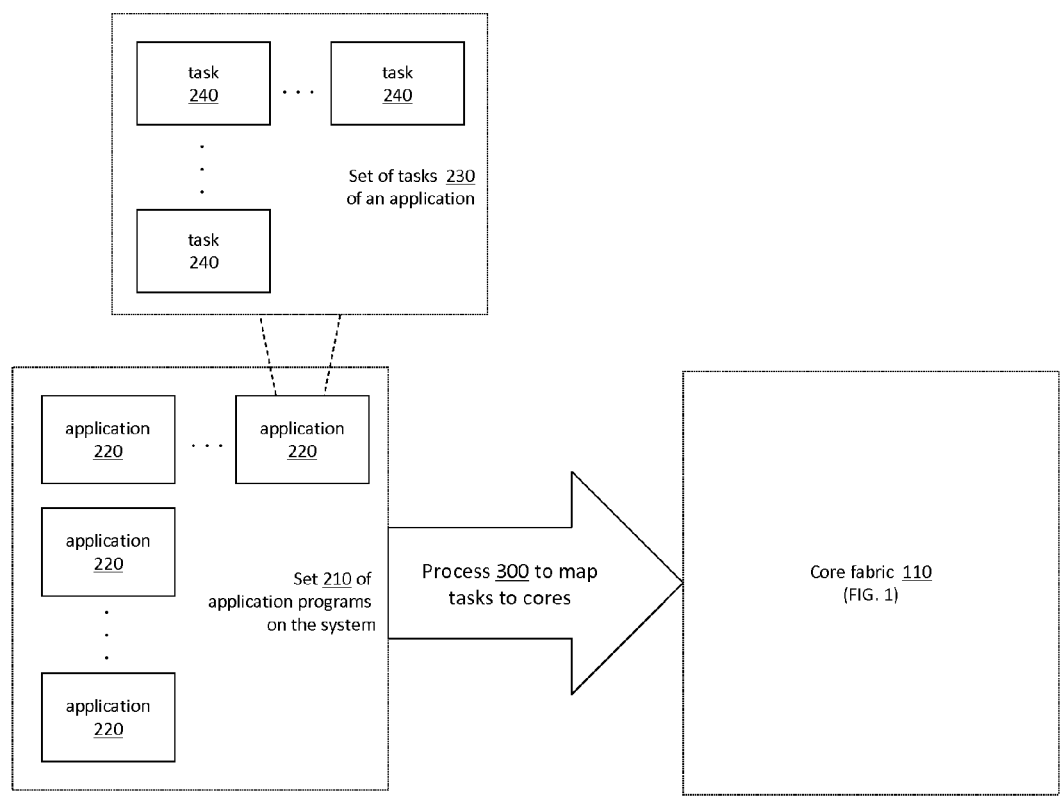
FIG. 2 provides a context diagram for a process, implemented on a system per FIG. 1, to select and map active tasks of application programs configured to run on the system to their target processing cores, in accordance with an aspect of the invention.
Figure 3:
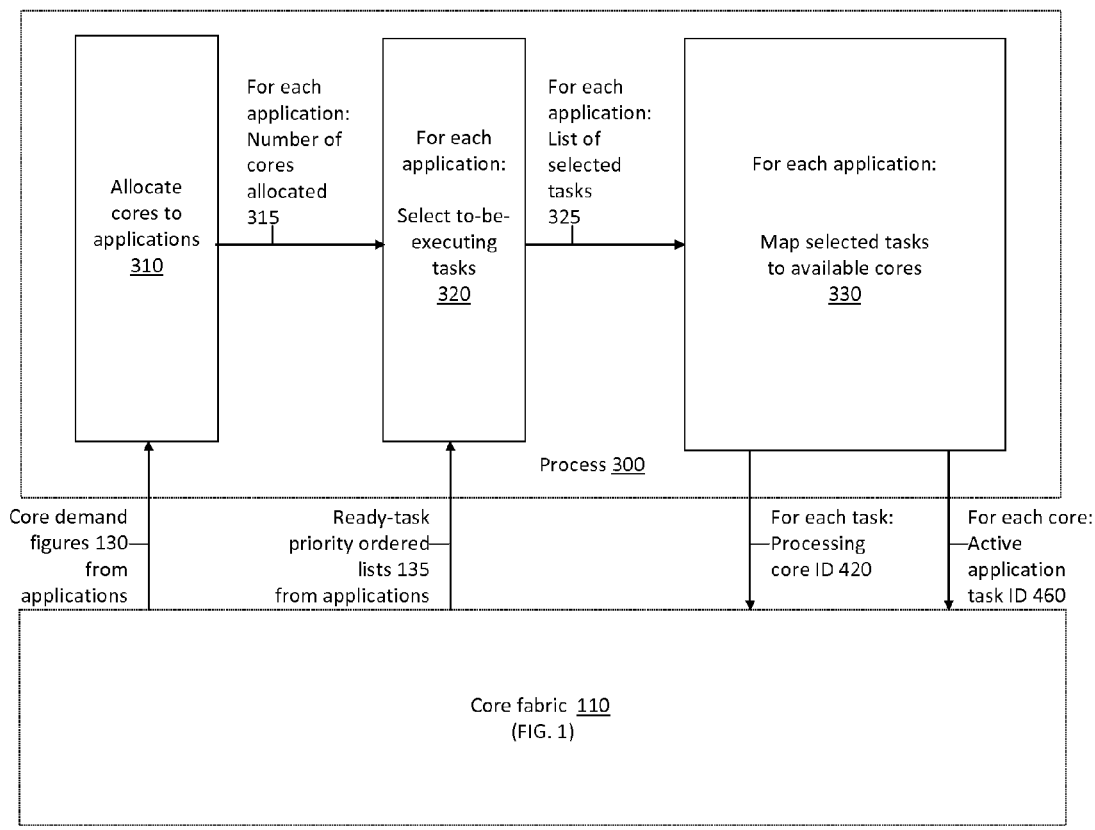
FIG. 3 illustrates, in accordance with an aspect of the invention, a flow diagram and major steps for a process per FIG. 2.

FIGS. 1-3 and related descriptions below provide specifications for a multi-core data processing platform, according to embodiments of aspects of the invention, while FIGS. 4-7 and associated descriptions provide specifications for networking and memory resources to enable dynamically running any selected data processing task on any processing core of the platform as well as to support efficient communications among such tasks, according to embodiments of aspects of the invention.

FIG. 1 provides a functional block diagram for an embodiment of the invented multi-core data processing system dynamically shared among data processing tasks of application software programs, with capabilities for application processing load adaptive allocation of the cores among the software applications configured for the system, as well as (as described in relation to FIGS. 4-7) efficient inter-core task-switching and inter-task communication resources.

Note that the terms software program, application program, application and program are used interchangeably in this specification, and each generally refer to any type of computer software able to run on data processing systems according to any embodiments of the invention. Also, references to a "set of" units of a given type, such as programs, logic modules or memory segments can, depending on the nature of a particular embodiment or operating scenario, refer to any positive number of such units.

For general context, the system per FIG. 1 comprises processing core fabric 110 with an array 115 of cores 120 for processing instructions and data of a set of software application programs configured run on the shared system 100. While in such a manner processing the application programs to produce processing results and outputs, the cores of the system access their input and output data arrays, which in embodiments of the invention comprise memories and input/output communication ports accessible directly or indirectly to one or more of the cores. Since the discussion herein is directed primarily to techniques for dynamically sharing the processing cores of the system among its application programs as well as for efficiently running such programs on the cores of the system in parallel, rather than on implementation details of the cores themselves, aspects such as memories and communication ports of the cores or the system 100, though normally present within embodiments of the multi-core data processing system 100, are not shown in FIG. 1. Moreover, it shall be understood that in various embodiments, any of the cores 120 of a system 100 can comprise any types of software program processing hardware resources, e.g. central processing units, graphics processing units, digital signal processors or application specific processors etc. Embodiments of systems 100 can furthermore incorporate CPUs etc. processing cores that are not part of the dynamically allocated array 115 of cores, and such CPUs etc. outside the array 115 can in certain embodiments be used to manage and configure e.g. system-wide aspects of the entire system 100, including the controller module 140 of the system and the array 115.

As illustrated in FIG. 1, the invention provides a data processing system 100 comprising an array 115 of processing cores 120, which are dynamically shared by a set of application programs configured to run on the system. In an embodiment of the invention, the individual application programs running on the system maintain at specified addresses within the system 100 memories their processing capacity demand indicators signaling 130 to the controller 140 a level of demand of the system processing capacity by the individual applications. In a particular implementation, each of these indicators 130, referred to herein as core-demand-figures (CDFs), express how many cores 120 their associated application program is presently able utilize for its data processing tasks. Moreover, in certain embodiments, the individual applications maintain their CDFs at specified registers within the system, e.g. in known addresses within the memory space of their root processes (i.e. task ID#0 of each application), with such application CDF registers being accessible by hardware logic of the controller module 140. For instance, in an embodiment, the CDF 130 of a given application program is a function of the number of its schedulable tasks, such as processes, threads or functions (referred to collectively as tasks) that are ready to execute at a given time. In a particular embodiment of the invention, CDF of an application program expresses on how many processing cores the program is presently able to execute in parallel. Moreover, in certain embodiments, these capacity demand indicators, for any given application, include a list 135 identifying its ready tasks in a priority order.

A hardware logic based controller module 140 within the system, through a repeating process, allocates and assigns the cores 120 of the system 100 among the set of applications and their tasks, at least in part based on the CDFs 130 of the applications. In certain embodiments, this application task to core assignment process 300 (see FIGS. 2 and 3) is exercised periodically, e.g. at even intervals such as once per a given number (for instance 64, or 1024, or so forth) of processing core clock or instruction cycles. In other embodiments, this process 300 can be run e.g. based on a change in the CDFs 130 of the applications 220. Also, in particular implementation scenarios, the conceptual module 140 includes application program specific sub-modules, which run task to core assignment algorithms within a given application program based on a change in the task priority listing 135 for the given application. While such conceptual application-specific sub-modules can impact which application tasks will be executing on the fabric 110, they will not by themselves change the numbers of cores allocated to any given application on the system. Accordingly, these application-internal task selection sub-processes can be run also in between of successive runs of the complete core allocation and assignment process 300. The application task to core assignment algorithms of controller 140 produce, for the cores of the fabric 115, identification of their respective tasks to process 460, as well as for the application tasks on the system, identification of their execution cores 420 (if any, at a given time). Note that the verb "to assign" is used herein reciprocally, i.e., it can refer, depending on the perspective, both to assignment of cores 120 to tasks 240 (see FIG. 2) as well as to mapping of tasks 240 to cores 120. This is due to that, in the embodiments studied here in greater detail, the allocation and mapping algorithms of the controller 140 cause one task 240 to be assigned per any given core 120 of the array 115 by each run of such algorithms 300 (see FIGS. 2 and 3). As such, when it is written here, e.g., that a particular core #X is assigned to process a given task #Y, it could have also been said that task #Y is assigned for processing by core #X. Similarly, references such as "core #X assigned to process task #Y", could be written in the (more complex) form of "core #X for processing task #Y assigned to it", and so forth.

Though not explicitly shown in FIG. 1, embodiments of the system 100 also involve timing and synchronization control information flows between the controller 140 and the core fabric 115, to signal events such as launching and completion of the process 300 (FIGS. 2-3) by the controller as well as to inform about the progress of the process 300 e.g. in terms of advancing of its steps (FIG. 3). Also, in embodiments of the invention, the controller module is implemented by digital hardware logic within the system, and in particular embodiments, such controller modules exercise their repeating algorithms, including those of process 300 per FIGS. 2-3, without software involvement. Embodiments for the communications network and memory resources 400 of the multi-core fabric 110 are described in relation to FIGS. 4-7.

FIG. 2 illustrates context for the process 300 performed by the controller logic 140 of the system 100, repeatedly mapping the to-be-executing tasks 240 of the set of application programs 210 to their target cores 120 within the array 115. In an embodiment, each individual application 220 configured for a system 100 provides a (potentially updating) collection 230 of its tasks 240, even though for clarity of illustration in FIG. 2 this set of applications tasks is shown only for one of the applications within the set 210 of applications configured for a given instance of system 100.

For the sake of illustration and description, the cores of within the array 115 are herein identified with their core ID numbers from 0 through the number of cores within the array 115 less 1, the applications within the set 210 with their application ID numbers from 0 through the number of applications among that set 210 less 1, and the set of tasks 230 of any given application with their task ID numbers from 0 through the number of tasks supported per the given application less 1.

Note also that in certain embodiments, any application program instance 220 for a system 100 can be an operating system (OS) for a given user or users of the system 100, with such user OS supporting a number of applications of its own, and in such scenarios the OS client 220 on the system 100 can present such applications of it to the controller 140 of the system as its tasks 240. Moreover, in embodiment of the invention, among the applications 220 there can be supervisory or maintenance software programs for the system 100, used for instance to support configuring other applications 220 for the system 100, as well as provide general functions such as system boot-up and diagnostics, and facilitate access to networking, I/O and system-wide memory etc. resources of the platform 100 also by other application programs of the system.

In the general context per FIGS. 1 and 2, FIG. 3 provides a conceptual data flow diagram for an embodiment of the process 300, which maps each selected-to-execute application task 240 within the sets 230 to one of the cores 120 within the array 115.

FIG. 3 presents, according to an aspect of the invention, conceptual major phases of the task-to-core mapping process 300, used for maximizing the application program processing throughput of a data processing system hardware shared among a number of software programs. Such process 300, repeatedly mapping the to-be-executing tasks of a set of applications to the array of processing cores within the system, involves series of steps as follows:

(1) allocating 310 the array of cores among the set of programs on the system, at least in part based on CDFs 130 by the programs, to produce for each program 220 a number of cores 220 allocated to it 315 (for the time period in between the current and the next run of the process 300); and
(2) based at least in part on the allocating 310, for each given application that was allocated at least one core: (a) selecting 320, according to the task priority list 135, the highest priority tasks within the given application for execution corresponding to the number of cores allocated to the given application, and (b) mapping 330 each selected task to one of the available cores of the array 115, to produce, i) for each core of the array, an identification 460 of an application and a task within the application that the given core was assigned to, as well as ii) for each application task selected for execution on the fabric 115, identification 420 of its assigned core.

The repeatedly produced and updated outputs 420, 460 of the controller 140 process 300 will be used for repeatedly re-configuring connectivity through the fabric network 400, as described in the following FIGS. 4-7. and related specifications below describe embodiments for on-chip network 400 of a system 100 and operating scenarios thereof, to achieve non-blocking transferring of memory images of tasks of software programs between cores of the fabric 110, as well as inter-task communication, through efficiently arranged access to fabric memories. The inter-core and inter-task information exchange resources per FIGS. 4-7, in an embodiment of the invention, comprise hardware logic, and are capable of operating without software. The capabilities per FIGS. 4-7 provide logic, wiring, memory etc. system resource efficient support for executing any application task 240 at any core 120 within the system at any given time, as controlled, at least in part, by the controller 140 that regularly optimizes the allocation of cores of the array 115 among the applications 220 on the system 100, as well as maps specific application tasks 240 to specific processing cores 120. The minimum overhead inter-task communications, also supported by the on-chip network 400, further enables resource efficiently achieving high performance for the application software programs 210 that dynamically share the multi-core based data processing platform 100.

Figure 4:
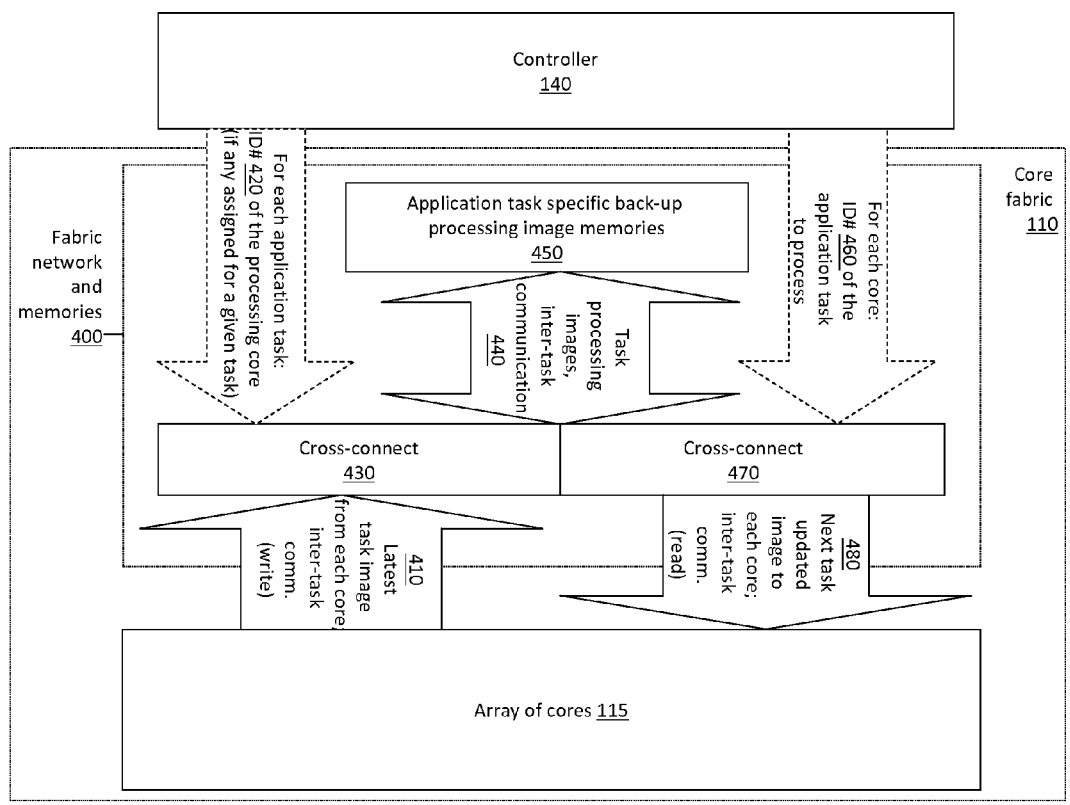
FIG. 4 illustrates, in accordance with an embodiment of the invention, a network and memory architecture for the multi-core fabric of a system per FIG. 1.

FIG. 4 illustrates the task image transfer and inter-task communications network and memory resources 400 for an embodiment of the core fabric 110 (see FIG. 1 for further context of the conceptual module 400). Note that in FIGS. 4-7, for clarity of illustration of the functionality of the inter-core and inter-task communications facilities, certain signals that are primarily control signals (as contrasted with data buses and such) are marked with gapped-line arrows. Examples of such control signals are control information flows provided to direct the multiplexing of the read and write data buses.

Figure 5:
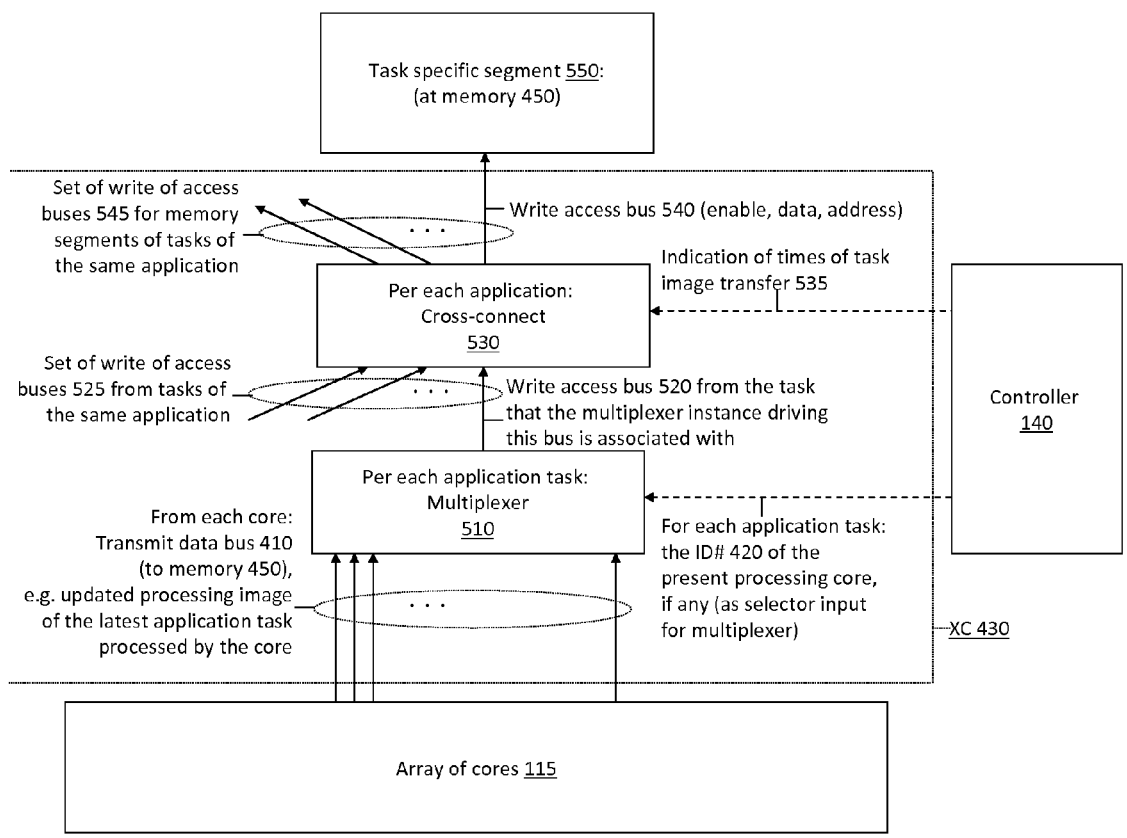
FIG. 5 shows at more detail level a portion of an embodiment of a logic system per FIG. 4 concerning functions of backing up updated task memory images from the cores of the fabric to the task specific segments in fabric memories, as well as writing of inter-task communication information by tasks of application programs running on the system to such memory segments of each others.
Figure 6:
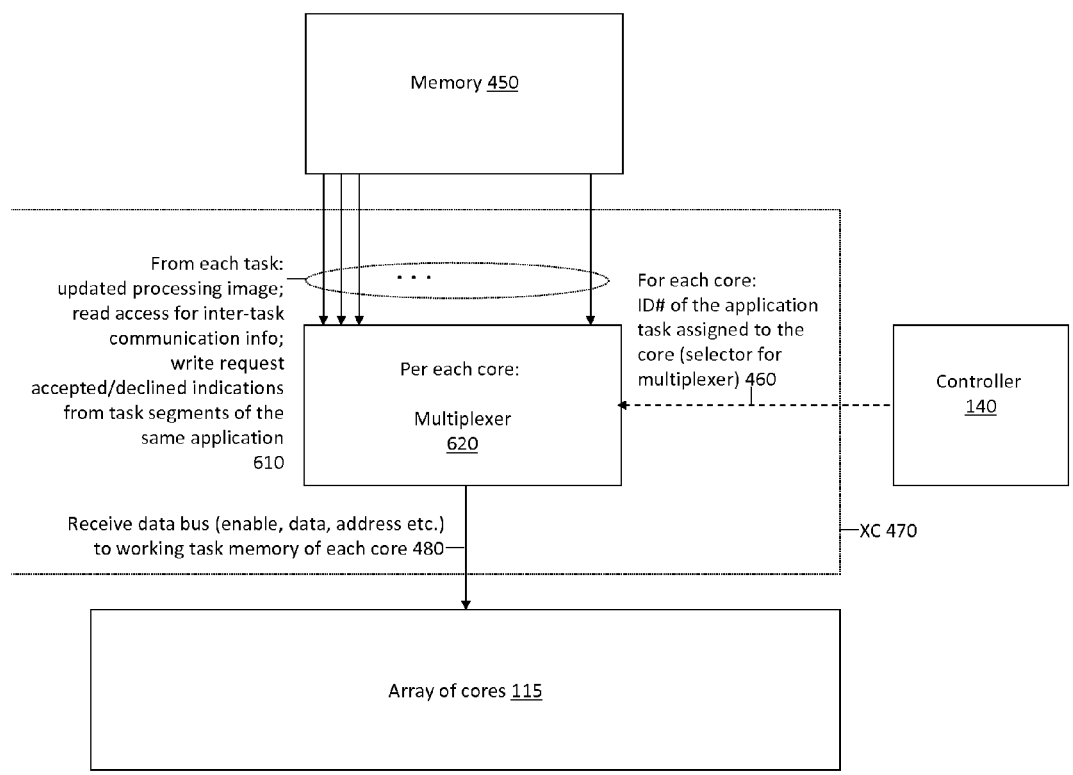
FIG. 6 shows at more detail level an embodiment of a portion of a logic system per FIG. 4 concerning functions of retrieving updated task memory images from the task specific segments in the fabric memories to their next processing cores within the fabric, as well as reading of inter-task communication information by tasks of applications running on the system from their segments in such memories.

Fabric Network for System Per FIG. 1: Transferring Memory Images of Tasks of Software Programs Executing on the System Between Cores and Backup Memories of the Multi-Core Processing Fabric:

Regarding system functionality for switching executing tasks for cores of fabric 110, FIG. 4 provides a conceptual diagram for a logic system 400 to back-up and transfer the latest processing memory image (referred to herein on herein also simply as image) of any application program task 240 on the system 100 from and to any core 120 within the array 115, in accordance with an embodiment of the invention. As will be described later on (after the description of FIG. 6), the inter-core network and memory system 400 will, at least in certain embodiments, be used also for inter-task communication among the application program tasks running on the system 100. Note that in relation to FIGS. 4-7, in embodiments of the invention where the individual core specific memories within the array are not intended to contain the instructions and data for all the application tasks on the system, but rather for the specific task assigned for any individual core at a given time, the notion of task processing image refers to the memory image used by the processing of the task. Various embodiments, implementing various designs between (and including) the extremes, on one end, of each core providing a dedicated memory segment for each application task on the system and, on the other end, of each core providing a plain working memory holding the memory image of the application task assigned to it, will have their corresponding definitions of what information needs to be transferred between cores and interim memories (if any) to backup, retrieve or relocate a task. In scenarios studied in detail in the following in connection with FIGS. 4-7, it is assumed that each core of the array 115 holds in its memory the image of the application task assigned to it at a given time. Such a scenario significantly reduces the amount of memory needed by the individual cores as well as across the system 100, while it calls for a capability to transfer the task processing memory images between cores and back-up memories when having to resume processing of a task after a period of inactivity, possibly at a different core than its previous processing core. FIGS. 4-6 and related descriptions below illustrate a logic system with such a memory image transfer capability.

At a digital logic design level, according to the herein studied embodiments per FIG. 4, the controller 140 identifies 420, to a cross-connect (XC) 430 between the core array 115 and memory array 450, the appropriate source core from which to select the updated image 440 for each given application task specific segment 550 within the memory 450. In an alternative embodiment, each core 120 identifies 420 the application task ID# along with its updated processing image to the XC 430. In addition, at times of task switchover, under control from the controller 140, the appropriate updated new task processing images 440 are transferred from the memories 450 through another controller controlled 460 cross-connect (XC) 470 to each given core of the array 115 subject to task switchover 120. Specifically, the controller 140 provides for the XC 470 identification 460 of the next application tasks 440 for the individual cores of the array 115, which causes the appropriate updated processing image to be transferred 480 from the memory array 450 to each given core of the system 100 subject to task switchover.

Naturally, any given core for which the assigned application task ID# remains the same on successive core allocation periods can resume processing such task uninterruptedly through such allocation period boundaries, without having halt processing.

Note also that in case of certain embodiments, the XCs 430 and 470 are collectively referred to as a cross-connect between the array 115 of cores and the memories 450 of the fabric 110. Also, in certain scenarios, the concept of on-chip network refers to the XCs 430 and 470 and the fabric and core memory access buses 410, 440, 480 they cross-connect, while in other scenarios, that concept includes also the fabric memories 450.

In a particular operating scenario, at end of any given core to task allocation period or after the set of tasks of any given application selected for execution chances (even within a core allocation period), for each such core within the system that got assigned a different next task to process (with such cores referred to as cores subject to task switchover), the updated processing image of its latest task is backed up 410 to a memory 450 that provides a dedicated memory segment 550 and related access logic (FIGS. 5-7) per each application task configured for the system 100. Specifically, in an embodiment, controller 140 through logic with core-specific multiplexers at XC 470 provides, at least conceptually as part of the bus 480, indications to the cores 120 regarding task switchovers, in response to which system software at the cores subject to a switchover causes the existing task to be backed up 410 to its segment 550 at memory array 450 and, following that, to retrieve 480 the next task's image from its segment 550 at memory array 450. Moreover, in a particular embodiment, after a core subject to task switchover has backed up 410 its outgoing task, the core will signal back to its multiplexer (element 620 in FIG. 6) at XC 470 to apply the provided new configuration 460, to cause the incoming application's image to be transferred 480 (under control of the core's system software) to the working memory of the core, and so that the incoming task assigned to execute on the core will be connected (in read mode) 480 to its segment 550 at memories 450. Furthermore, according to such embodiments, the system software on a core subject to switchover also signals to controller 140 about completion of backing up its outgoing task, based on which the controller applies the updated configuration 420, i.e. identification of the incoming task ID#, for the task-specific multiplexer 510 at XC 430, so that the incoming task assigned to execute on the core is connected (in write mode) 410 to memory segments 550 of tasks of its application 220, as well as so that the core of its execution will be connected in write mode to the correct memory segment 550 once that task is to be backed up 410 (see also FIG. 5 for further details). Note further that in certain embodiments of the invention, cores 120 support two sides of their working memories, to allow backing up 410 and retrieving 480 of the outgoing and incoming tasks to proceed concurrently, by copying 480 the incoming task's image to different side of the working memory than what was used for the outgoing task's image, and by switching the active side of the working memory to the incoming task's side following the copying of its image from its segment 550 at the fabric memories 450. According to certain implementation practices, the cores also provide a memory space for their system software, which however, according to the herein discussed operating scenarios, is not activated during user application task processing times (i.e. between task switchovers).

According to the embodiments of the invention described herein in greater detail, based on the control 460 by the controller 140 for a given core indicating that it will be subject to a task switchover, the currently executing task is made to stop executing and its processing image is backed up 410, 520, 540 to the memory 450 (FIGS. 4 and 5), and following (as well as in certain embodiments, during) that, the memory image of the next task assigned to execute on the given core is retrieved 610, 480 to the core from the memory 450 (FIGS. 4 and 6). During these application task switching proceedings the operation of the cores subject to task switchover is controlled through the controller 140 and system software configured for the cores, with said system software managing the backing up and retrieving of the outgoing and incoming task memory images from the memories 450, as well as stopping the execution of the outgoing task before backing it up and getting the incoming task processing started once the local working memory of the core is configured with the incoming task's processing image. In these type of embodiments, cores not indicated by controller 140 as being subject to task switchover are able to continue their processing uninterruptedly even over the core allocation period transition times without any idle time.

Note that, according to embodiments of the invention described in the foregoing, applying of updated task ID# configurations 460 for the core specific multiplexers 620 of XC 470 (see FIGS. 4 and 6), as well as applying of the updated processing core ID# configurations 420 for the application task specific multiplexers 510 at XC 430 (see FIGS. 4 and 5), can thus be safely and efficiently done on one multiplexer at a time basis (reducing the system hardware and software implementation complexity and thus improving cost-efficiency), since tasks do not need to know whether and at which core in the fabric 115 they or other tasks are executing at any given time. Instead of relying on knowledge of the their respective previous, current (if any at any given time) or future execution cores by either the tasks or the system software of the cores, the invention enables flexibly running any task of any application at any core of the fabric, while providing inter-task communication more cost-efficiently through connecting the cores to their appropriate application task specific segments 550 at the fabric memories 450.

FIG. 5 shows, at a more detail level, a portion of the logic system 400 (see FIGS. 1 and 4 for context) for backing up the updated task processing images from the cores of the system 100 to the task specific back-up memories 450, in accordance with an embodiment of the invention. As will be discussed later on, following the description per FIG. 6, the logic system per FIG. 5 is, in certain embodiments, used also for the tasks of any given application executing on the system 100 to write their inter-task communication info for each others.

In the task memory image backup mode of use of the logic per FIG. 5, according to the embodiment studied here in greater detail, each core 120 of the array 115 that is subject to task switchover transmits 410, through the XC 430 to its segment 550 in the memories 450 the updated processing image of its latest application task when signaled to do so by controller 140, in embodiments through its associated multiplexer 620 at XC 470. The XC 430 comprises, in a particular embodiment, a set of application task specific multiplexers 510, each of which selects the updated processing image instance from the set 410 corresponding to its task ID# for writing 540 to its associated task specific segment 550 at the memory array 450. Each such task specific multiplexer 510 make theses selections based on control 420 from the controller 140 that identifies the core that processed its associated application task before a task switchover. In case a given task was not being processed at a given time, in an embodiment the controller controls 420 the multiplexer 510 instance associated with such task to not write anything on its associated segment 550 on the memory 450. In addition, the buses 410, 525 and 545 include a write enable indicator, along with write data and address (and any other relevant signals), from their source cores to the memory segments 550, to control (together with other system logic, e.g. per FIG. 7) write access from cores 120 to memory segments 550. The role of XC 530 will be described in reference to FIG. 7; for the task memory image backup mode, the XC 530 can be considered as being controlled 535 by the controller to simply pass-through connect the write access bus 520 of each application task finishing execution on a core of the array 115 to its segment 550 at memories 450.

At digital logic design level, a possible implementation scenario for functionality per FIG. 5 is such that the signal bus instance within the set 410 carrying the updated processing images from the core ID #n (n is an integer between 0 and the number of cores in the array less 1) is connected to the data input #n of each multiplexer 510 of XC 430, so that the identification 420 of the appropriate source core ID# by the controller to a given multiplexer 510 causes XC 430 to connect the updated task processing image transmissions 410 from the core array 115 to their proper task specific segments 550 within the memory 450.

In an embodiment, controller 140 uses information from an application task ID# addressed look-up-table per Table 4 format (shown in later in this specification) in supplying the latest processing core identifications 420 to the application task specific multiplexers 510 of XC 430.

FIG. 6 shows at a greater level of detail, in accordance with an embodiment of the invention, a portion of the logic system per FIG. 4 for retrieving the updated task processing images from the task specific back-up memories to their next processing cores within a system per FIG. 1. As will be discussed following this description of FIG. 6, the logic system per FIG. 6 is, in certain embodiments, used also for the tasks of an application executing on the system 100 to read their inter-task communication info from each others.

According to the embodiment studied here in greater detail, the XC 470 (see FIG. 4 for context) comprises core specific multiplexers 620, each of which, when operating in the task image transfer mode, selects the updated image (from set 610) of the task identified 460 for processing by the core associated with a given multiplexer 620 to be transferred 480 to the working memory of that core 120.

Similar to the digital logic level description of the multiplexer 510 (in connection to FIG. 5), a possible implementation for functionality illustrated in FIG. 6, is such that the read data bus instance (from set 610) associated with application task ID #m (m is an integer between 0 and the number of application tasks supported by the system less 1) is connected to the data input #m of each multiplexer 620 instance, so that the identification (by the controller 140) of the active application task ID#460 for each of these core specific multiplexers 620 of XC 470 causes the XC 470 to connect each given core 120 of the array 115 in read mode to the segment 550 at memory 450 associated with its indicated 460 active application task.

In an embodiment, controller 140 uses information from a core ID# addressed look-up-table per Table 5 format (shown in later in this specification) in supplying the next application task identifications 460 to the application core specific multiplexers 620 of XC 470.

Fabric Network for System Per FIG. 1: Inter-Task Communication Among Software Programs Executing on the Multi-Core Fabric of the System:

In addition to capabilities to activate, deactivate and relocate tasks 240 among cores 120 of a system 100 through the task image transfers as outlined above in connection with FIGS. 4-6, the system 100 enables the tasks 240 of the application programs 220 on the system to communicate with each other, e.g. to call and return to each other, passing input and output data (incl. pointers, for instance, to general memory and I/O facilities of system 100), between cores of the fabric 110. Such inter-task communication within an application program executing at system 100, in an embodiment of the invention, is handled by using logic, wiring and memory resources 400 per FIGS. 4-7 during the task processing times (i.e. when these XC and related resources are not being used for task image transfers).

According to the herein described embodiments, where XC 430 has dedicated multiplexers 510 and 720 for each application task configured to run on the multi-core processing fabric 110, in order to provide a write access from any core of the array 115 to any task specific segment 550 at the fabric memory 450, any number of, up to all, tasks executing on the multi-core fabric are able to concurrently write their inter-task communication information to memory segments of other tasks, in a particular implementation, at least within the scope 230 of their own application, as well as their own segment. Similarly, embodiments of the invention where XC 470 has a dedicated multiplexer 620 for each core of the fabric, in order to provide any core of the array 115 with a read access to any task specific segment 550 at memories 450, enable any number of, up to all, tasks of executing on the array 115 to concurrently read their inter-task communication information from memories 450, in a particular implementation, specifically, from their own segments 550 at the memories 450. Moreover, such embodiments further support any mix or match of concurrent writes and reads per above. Such non-blocking inter-task communications connectivity through the fabric network 400 facilitates high data processing throughput performance for the application programs 220 configured to run on the system 100.

Specifically, at a particular embodiment of the invention, the inter-task communication using the XCs 430, 470 and attached wiring shown in FIGS. 4-7 is supported among the set of tasks 230 of any given individual application program 220. Additionally, inter-application communication is supported at embodiments of system 100 through further networking, I/O and memory access means, including software based client/server and/or peer-to-peer communications techniques and networking and I/O ports as well as general memories of the cores 120 and the system 100. In a specific embodiment, the application-scope 230 inter-task communication is facilitated through providing the tasks 230 of any given application, while executing on the core array 115, with a write access 410 to the segments 550 of each others (including their own), in the memory 450, and a read access 480 to their own segments 550.

Following the image transfers of a task switchover, the new task executing on any given core has a connection through XC 470 to its memory segment 550, so that data specific to the new task can be read from the memory 450 to its assigned execution core. In an embodiment, each task periodically polls its memory segment 550 for any new information written for it by other tasks, and accordingly reads any such new information, where applicable transferring such information, or further information pointed by said new information written by other tasks (e.g. from a general memory of the system 100), to the local working memory at its processing core. In alternative embodiments, logic associated with memory segments 550 generates interrupt-type notifications to the core at that time associated with any given memory segment 550 following a write operation to such segment, for the task 240 executing on such core 120 to know that it has new inter-task communications to read at its memory segment 550. The receiving task controllable reading of data from its memory segment 550 is accomplished in a particular embodiment, together with the data access resources and procedures as discussed, by providing address line driven by the receiving core to its memory segment 550; in such an embodiment, the cores provide the addresses (of task specific segment 550 scope within memory 450) for the data entries to be loaded on the buses 610, 480 connected to the given core. While the connection from the buses 610 to buses 480, to connect each executing task's memory segment 550 to its processing core is connected through XC 470, the addresses for the executing tasks to read their memory segments 550 are connected from the processing cores of the tasks to their memory segments 550 (at least conceptually) through XC 430, which, using same control 420, connects also write access data buses from the cores to memories 450. In particular logic implementations where separate read and write addresses are used per each given task executing at any of the cores of the array, the read address is configured to pass through the XC 530 (and logic per FIG. 7) i.e. gets connected directly from the task specific multiplexer 510 to the memory segment 550 associated with the given task, while the write address gets further cross-connected through the XC 530.

In addition to the read access by any task to its own memory segment 550 (as described above), by providing write access by tasks of a given application 230 to each other's (incl. their own) memory segments 550 at the fabric memory 450, the tasks of any given application on system can communicate with each other in each direction. In an embodiment of the invention, such a write access is provided, in part, by having the control information 420, i.e. the ID# of the core assigned to any given application task, from controller 140 be applied to the XC 430 right after the completion of each run of the placement process 300 (incl. completion of task image back-ups), so that the updated information 420 is usable by the XC already during the task processing time of the core allocation periods rather than only at its end (when it is used to direct the task image back-ups). This causes that, while the tasks of any given application are processed at whatever set of cores within the array 115, their associated write-access connections 540 to memories 450 point to their current application task segment 550 at the memories 450. Moreover, when the task 240 ID#s of any given application 220, per the Table 4 format used for the info 420, comprise same common (at least conceptually most significant bits based) prefix, and when accordingly the task memory segments 550 of any given application 220 are within a contiguous memory range within the memory array 450, the set 525 (FIG. 5) of write access buses 540 of the tasks 230 of the same application collectively point to the collective memory range of that application within the memory 450. As such, by providing a further XC 530 between said set of write access buses 525 of a given application and the eventual write access buses 545 to the task segments 550 of the given application at memory 450, and by having the application tasks from their processing cores to provide the control to XC 530, along with their write access bus signals through their task specific multiplexers 510, write access by any task of an application to the memory segments 550 of all tasks of the same application is accomplished. Note that according the embodiments described here in at detail level, there is one XC 530 per each application 220 supported by the system 100.

At the task memory image transfer time for cores subject to task switchover, the XCs 530 are to be controlled to pass through the image transfer from any core to the memory segment 550 dedicated to the task for which the given core was assigned to prior the switchover. In an embodiment, this image transfer time control 535 for XCs 530 is provided by the controller 140. Alternatively, it can be provided by the application tasks, using same mechanisms as during the task processing time, i.e., during the time periods outside the task image transfer times for any given core (described in the following).

Figure 7:
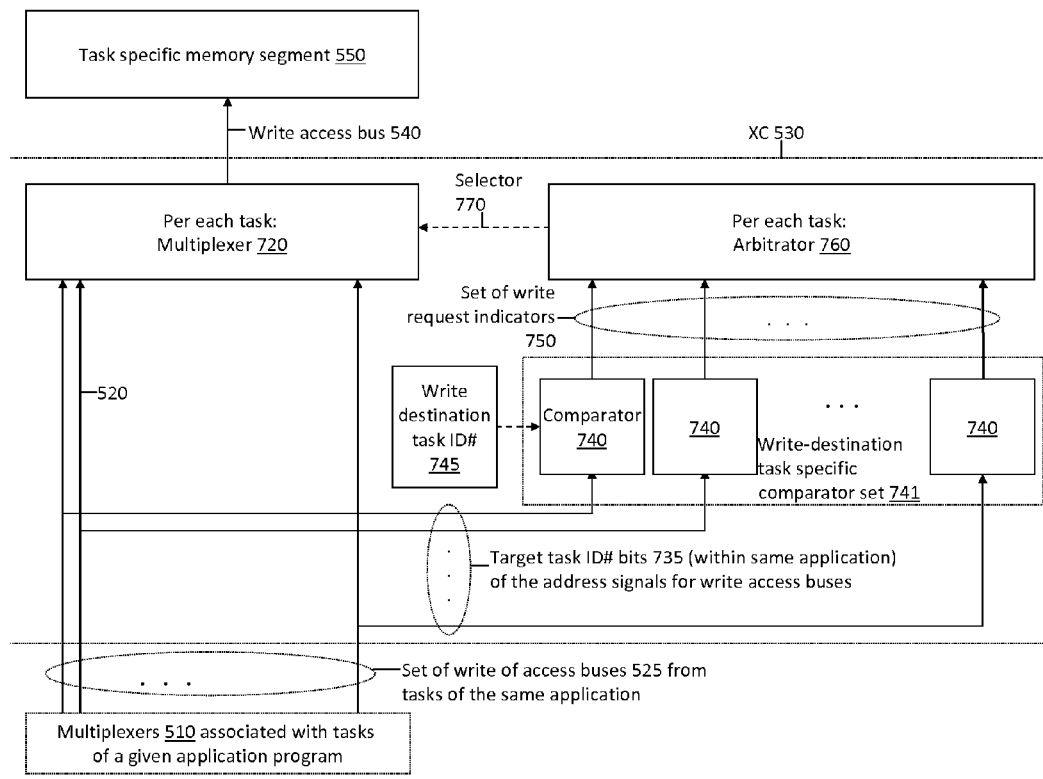
FIG. 7 presents at further level of detail an embodiment of logic functionality for the subsystem per FIG. 5, concerning a capability for tasks of an application program to write information to each other's, including their own, memory segments within the multi-core fabric.

During such task processing times, and while a task at a given core has an active write request or operation ongoing, the bus 410 from each core through the multiplexers 510 to the XC 530 identifies, among other relevant write access signals, the destination task of its write ( ); this identification of the same-application-scope task ID# can be provided e.g. as specified bit range 735 (FIG. 7) within the (write) address bits of buses 410 and 525. In an embodiment, as illustrated in FIG. 7, each application 220 specific XC 530 comprises a set of task 240 specific multiplexers 720 that are controllable through bus 520 instance specific comparators 740, each of which identifies 750 whether its associated task specific bus 520 instance is requesting a write access to the memory segment 550 dedicated to the task that a given multiplexer 720 instance is specific to. Each comparator 740 instance sets its output 750 to active state, e.g. logic high, if its input instance among set 735 matches the ID# of the task 745 that a given set of comparators 740 are associated with (which is the same task that the multiplexer 720 and the arbitrator 760 to which the outputs 750 from the given set 741 of comparators connect to are associated with). Each of the task specific set 741 of comparators 740 has its unique task ID# input 745; in an embodiment, there is one write-source task specific comparator among each write-destination task specific set 741 for each task of the application program that the multiplexer 720 serves. Within the context of FIG. 7, the sufficient scope of the write-destination task ID#745 is that of intra-application; here the write-destination task ID#745 is to identify one task 240 of among the set of tasks 230 of a given application program 240 that logic and memory resources per FIG. 7 are specific to. I.e., per any given set of comparators 741 associated with a particular write destination specific multiplexer instance 720, one common task ID#741, identifying that particular write destination task within its application, is sufficient. Note also that the set of buses 525 of a given application 220 will reach to the multiplexer 720 instance of each task 240 of the given application, even though, for the sake of clarity of illustration, in FIG. 7 only one of such task-specific multiplexers 720 of an XC 530 of the given application is shown.

Among the writing-source task specific bus 520 instances identified by their comparators 740, e.g. by high logic state on signal 750 driven by a given source task specific comparator instance, as requesting a write to the memory segment 550 of the task for which the given multiplexer 720 is dedicated to, an arbitrator logic module 760 will select 770 one bus 520 instance at a time for carrying out its write 540. The arbitrator 760 asserts a write accepted signal to the execution source core of the task so selected to carry out its write, while any other cores, in an embodiment among those requesting a write simultaneously, will get a write request declined signal from the arbitrator 760. While not shown in FIG. 7 for clarity of illustration of main functionality involved, the write accepted/rejected signals for any given tasks executing at the cores of the array 115, according to an embodiment of the invention, are connected from the arbitrators 760 associated with tasks 230 of their application program through the XC 470, along with the buses 610, 480 to their assigned cores; the write requested accepted/rejected indications from all tasks 230 of a given application become part of the bus 610 instance for any task (FIG. 6), and thus any given task executing on any core will continuously get the write accepted/rejected indications from all other tasks of its local application through its receive bus 480 from the module 400.

In an embodiment, the arbitrator 760 will choose the core accepted for write 540, in case of multiple simultaneously requesting cores, by using a linearly revolving (incrementing the selected task ID# by one and returning back to 0 from highest task ID#, while skipping any tasks not requesting a write) selection algorithm; in case of a single requesting core, the arbitrator simply accepts directly any such singular write request. Moreover, in order to prevent any single source task, through otherwise potentially long lasting writes 540 to a given destination task memory segment resources 550, from blocking other tasks from their fair time share of write 540 access to the given destination task's memory, certain embodiments of module 760 will run their source task selection algorithm periodically (e.g. every 64 or 1024 clock cycles or such) and, in case of a presence of multiple tasks with an active write request, chose a revolving new task (of the tasks requesting a write) accepted for write access following successive runs of its writing task selection algorithm.

In various embodiments of the invention, software of the application tasks 240 supports a protocol for exchanging information between themselves through the task specific segments 550 at the fabric memory array 450, so that multiple tasks are able to write successively to a memory segment 550 of a given task without overwriting each other's info, and so that the receiving task is able to keep track of any unread information written by any other task to its memory segment 550. According to one such an embodiment, each task specific memory segment 550 provides a reserved inter-task communications write and read memory space, referred to as a spool area, along with a writing control register or set of such registers at specified address(es) for the writing and reading tasks to keep track of where to write and read new information within the spool area. In certain scenarios, the spool area is divided into writing task specific sub-segments. In such scenarios, each writing task, being configured (e.g. through its task ID# within its application program) the location of its sub-segment within the spool area, can itself keep track of to which address to write its next block of information to a given receiving task's spool area, without needing a read access to any receiving task's memory segment 550. In addition, the writing tasks, after completing a write to a receiving task's spool area, in the herein discussed embodiments, update their related write control register at the receiving task's memory segment 550, to inform the receiving task of the new write operation (e.g. the address up to which there is new information to be read). When each writing task uses its spool area at receiving task's memory segment 550 as a circular buffer, with the buffer write address counter returning to zero after reaching the maximum length configured for their spool sub-segment, one way of preventing any given writing task from overwriting any unread information at its spool sub-segment is that each receiving task repeatedly writes for its writing tasks (using the above described inter-task communication mechanism) the maximum address up to which any given writing task is presently allowed to write at the receiving task's spool, according to until what address the receiving task has read the spool sub-segment in question. Through this method the writing task is also able to keep track of how much of its written information the receiving task has confirmedly read by any given time. As discussed above, in certain embodiments, the tasks repeatedly read the write control registers of their spool areas, to know whether and where they have newly written information from other tasks to read. In alternative embodiments, changes to write control registers cause read request notifications (e.g. through processor interrupt mechanism) from memory segments 450 to their associated cores 120 of the array 115.

Regarding descriptions of the drawings herein, note that in various embodiments, the modules and steps of the on-chip network 400 as well as the controller 140 and process 300 providing control for the fabric network 400 can be implemented using various combinations of software and hardware logic, and for instance, various memory management techniques can be used to pass (series of) pointers to the actual memories where the data elements of concern are available, rather than passing directly the actual data, etc.

Module-Level Implementation Specifications for the Application Task to Core Placement Process:

While module level logic specifications were provided in the foregoing for embodiments of the on-chip network 400, such details for embodiments of the steps of the process 300 (FIG. 3) are described in the following. In an embodiment of the invention, the process 300 is implemented by hardware logic in the controller module 140 of a system per FIG. 1.

In the herein studied operating scenarios, objectives for the core allocation algorithm 310 include maximizing the system core utilization (i.e., minimizing core idling so long as there are ready tasks), while ensuring that each application gets at least up to its entitled (e.g. a contract based minimum) share of the system core capacity whenever it has processing load to utilize such amount of cores. In the embodiment considered herein regarding the system capacity allocation optimization methods, all cores 120 of the array 115 are allocated on each run of the related algorithms 300. Moreover, let us assume that each application configured for the given multi-core system 100 has been specified its entitled quota of the cores, at least up to which quantity of cores it is to be allocated whenever it is able to execute on such number of cores in parallel; typically, sum of the applications' entitled quotas is not to exceed the total number of cores in the system. More precisely, according to the herein studied embodiment of the allocation algorithm 310, each application program on the system gets from each run of the algorithm:

(1) at least the lesser of its (a) entitled quota and (b) Core Demand Figure (CDF) worth of the cores (and in case (a) and (b) are equal, the 'lesser' shall mean either of them, e.g. (a)); plus (2) as much beyond that to match its CDF as is possible without violating condition (1) for any application on the system; plus (3) the application's even division share of any cores remaining unallocated after conditions (1) and (2) are satisfied for all applications 210 sharing the system 100.

In an embodiment of the invention, the cores 120 to application programs 220 allocation algorithm 310 is implemented per the following specifications:

(i) First, any CDFs 130 by all application programs up to their entitled share of the cores within the array 115 are met. E.g., if a given program #P had its CDF worth zero cores and entitlement for four cores, it will be allocated zero cores by this step (i). As another example, if a given program #Q had its CDF worth five cores and entitlement for one core, it will be allocated one core by this stage of the algorithm 310.

(ii) Following step (i), any processing cores remaining unallocated are allocated, one core per program at a time, among the application programs whose demand 130 for processing cores had not been met by the amounts of cores so far allocated to them by preceding iterations of this step (ii) within the given run of the algorithm 310. For instance, if after step (i) there remained eight unallocated cores and the sum of unmet portions of the program CDFs was six cores, the program #Q, based on the results of step (i) per above, will be allocated four more cores by this step (ii) to match its CDF.

(iii) Following step (ii), any processing cores still remaining unallocated are allocated among the application programs evenly, one core per program at time, until all the cores of the array 115 are allocated among the set of programs 210. Continuing the example case from steps (i) and (ii) above, this step (iii) will be allocating the remaining two cores to certain two of the programs. In particular embodiments, the programs with zero existing allocated cores, e.g. program #P from step (i), are prioritized in allocating the remaining cores at the step (iii) stage of the algorithm 310.

Moreover, in a certain embodiments, the iterations of steps (ii) and (iii) per above are started from a revolving application program within the set 210, e.g. so that the application ID # to be served first by these iterations is incremented by one (and returning to the ID #0 after reaching the highest application ID#) for each successive run of the process 300 and the algorithm 310 as part of it. Moreover, embodiments of the invention include a feature by which the algorithm 310 allocates for each application program, regardless of the CDFs, at least one core once in a specified number (e.g. sixteen) of process 300 runs, to ensure that each application will be able to keep at least its CDF 130 input to the process 300 updated.

According to descriptions and examples above, the allocating of the array of cores 115 according to the embodiments of the algorithm 310 studied herein in detail is done in order to minimize the greatest amount of unmet demands for cores (i.e. greatest difference between the CDF and allocated number of cores for any given application 220) among the set of programs 210, while ensuring that any given program gets at least its entitled share of the processing cores following such runs of the algorithm for which it demanded 130 at least such entitled share of the cores.

Once the set of cores 115 are allocated 310 among the set of applications 210, specific core 120 instances are assigned to each application 220 that was allocated one or more cores on the given core allocation algorithm run 310. In an embodiment, one schedulable 240 task is assigned per one core 120. Objectives for the application task to core placement algorithm 330 include minimizing the total volume of tasks to be moved between cores (for instance, this means that tasks continuing their execution over successive core allocation periods will stay on their existing core). In certain embodiments of the invention, the system controller 140 assigns the set of cores (which set can be zero at times for any given application) for each application, and further processes for each application will determine how any given application utilizes the set of cores being allocated to it. In other embodiments, such as those studied herein in further detail, the system controller 140 also assigns a specific application task to each core.

To study details of an embodiment of the process 300, let us consider the cores of the system to be identified as core #0 through core #(N−1), wherein N is the total number of pooled cores in a given system 100. For simplicity and clarity of the description, we will from hereon consider an example system under study with a relatively small number N of sixteen cores. We further assume here a scenario of relatively small number of also sixteen application programs configured to run on that system, with these applications identified for the purpose of the description herein alphabetically, as application #A through application #P. Note however that the invention presents no actual limits for the number of cores, applications or task for a given system 100. For example, instances of system 100 can be configured a number of applications that is lesser or greater than (as well as equal to) the number of cores.

Following the allocation 310 of the cores among the applications, for each active application on the system (that were allocated one or more cores by the latest run of the core allocation algorithm 310), the individual ready-to-execute tasks 240 are selected 320 and mapped 330 to the number of cores allocated to the given application.

The task selection 320 step of the process 300 produces, for each given application of the set 210, lists 325 of to-be-executing tasks to be mapped 330 to the subset of cores of the array 115. Note that, at least in some embodiments, the selection 320 of to-be-executing task for any given active application (such that was allocated 310 at least one core) is done, in addition to following of a chance in allocation 310 of cores among applications, also following a change in task priority list 135 of the given application, including when not in connection to reallocation 310 of cores among the applications. At least in such embodiments, the active task to core mapping 330 is done logically individually for each application, however keeping track of which cores are available for any given application, e.g. by running the mapping algorithm for application at a time, or first assigning for each application their respective subsets of cores among the array 115 and then running the mapping 330 in parallel for each application with new tasks to be assigned to their execution cores.

In the embodiments discussed herein in greater detail, the task to core mapping algorithm 330 for any application begins by keeping any continuing tasks, i.e., tasks selected to run on the array 115 both before and after the present task switchovers, mapped to their current cores also on the next allocation period. After that rule is met, any newly selected tasks for the application are mapped to available cores. Specifically, assuming that a given application was allocated P (a positive integer) cores beyond those used by its continuing tasks, P highest priority ready but not-yet-mapped tasks of the application are mapped to P next available (i.e. not-yet-assigned) cores within the array 115 allocated to the application. In case that any given application had less than P ready tasks, the highest priority other (e.g. waiting, not ready) tasks are mapped to the remaining available cores among the number (P) cores allocated to the given application; these other tasks can thus directly begin executing on their assigned cores once they become ready. Note further than, in an embodiment, the placing of newly selected tasks, i.e. selected tasks of applications beyond the tasks continuing over the switchover transition time, is done by mapping such yet-to-be-mapped application tasks in incrementing application task ID# order to available cores in incrementing core ID# order.

Summary of Process Flow and Information Formats Produced and Consumed by Main Stages of the Application Task to Core Mapping Process:

The production of updated mappings 460, 420 between selected application tasks 120 and the processing cores 120 of the system 100 by the process 300 (FIG. 3, implemented by controller 140 in FIG. 1) from the Core Demand Figures (CDFs) 130 and task priority lists 135 of the applications 220 (FIG. 2), as detailed above with module level implementation examples, proceeds through the following stages and intermediate results (in reference to FIG. 3), according to an embodiment of the invention:

Each application 220 produces its CDF 130, e.g. an integer between 0 and the number of cores within the array 115 expressing how many concurrently executable tasks 240 the application presently has ready to execute. A possible implementation for the information format 130 is such that logic with the core allocation module 310 periodically samples the CDF bits from the segment 550 at memory 450 dedicated to the (root process) task #0 of each application for and, based on such samples, forms an application ID-indexed table (per Table 1 below) as a 'snapshot' of the application CDFs to launch the process 300. An example of the format of the information 130 is provided in Table 1 below—note however that in the hardware logic implementation, the application ID index, e.g. for range A through P, is represented by a digital number, e.g., in range 0 through 15, and as such, the application ID # serves as the index for the CDF entries of this array, eliminating the need to actually store any representation of the application ID for the table providing information 130:

TABLE 1

| Application ID index | CDF value |
|---|---|
| A | 0 |
| B | 12 |
| C | 3 |
| ... | ... |
| P | 1 |

Regarding Table 1 above, note that the values of entries shown are simply examples of possible values of some of the application CDFs, and that the CDF values of the applications can change arbitrarily for each new run of the process 300 and its algorithm 310 using the snapshot of CDFs.

Based at least in part on the application ID # indexed CDF array 130 per Table 1 above, the core allocation algorithm 310 of the process 300 produces another similarly formatted application ID indexed table, whose entries 315 at this stage are the number of cores allocated to each application on the system, as shown in Table 2 below:

TABLE 2

| Application ID index | Number of cores allocated |
|---|---|
| A | 0 |
| B | 6 |
| C | 3 |
| ... | ... |
| P | 1 |

Regarding Table 2 above, note again that the values of entries shown are simply examples of possible number cores of allocated to some of the applications after a given run on the algorithm 310, as well as that in hardware logic this array 315 can be simply the numbers of cores allocated per application, as the application ID# for any given entry of this array is given by the index # of the given entry in the array 315.

The application task selection sub-process 325, done in embodiments of the process 300 individually, e.g. in parallel, for each application of the set 210, uses as its inputs the per-application core allocations 315 per Table 2 above, as well as priority ordered lists 135 of ready task IDs of any given application. Each such application specific list 135 has the (descending) task priority level as its index, and the intra-application scope task ID# as the value stored at each such indexed element, as shown in Table 3 below—notes regarding implicit indexing and non-specific examples used for values per Table 1-2 apply also for Table 3:

TABLE 3

| Task priority index # -- application internal (lower index value signifies more urgent task) | Task ID # (points to start address of the task-specific sub-range 550 within the per-application dedicated address range at memory 450) |
|---|---|
| 0 | 0 |
| 1 | 8 |
| 2 | 5 |
| ... | ... |
| 15 | 2 |

In an embodiment, each application 220 of the set 210 maintains its task priority list 135 per Table 3 at specified address at its task #0 segment 550 at memory 450, from where logic at controller 140 retrieves this information to be used as an input for the active task selection sub-process 320, which produces per-application listings 325 of selected tasks. Based at least in part on the application specific active task listings 325, the core to application task assignment algorithm module 330 produces a core ID# indexed array 420 indexed with the application and task IDs, and provides as its contents the processing core ID (if any), per Table 4 below:

TABLE 4

| Application ID -- MSBs of index | Task ID (within the application of column to the left) -- LSBs of index | Processing core ID (value 'N' here indicates that the given task is not presently selected for execution at any of the cores) |
|---|---|---|
| A | 0 | 0 |
| A | 1 | N |
| ... | ... | ... |
| A | 15 | 3 |
| B | 0 | 1 |

TABLE 4-continued

| Application ID -- MSBs of index | Task ID (within the application of column to the left) -- LSBs of index | Processing core ID (value 'N' here indicates that the given task is not presently selected for execution at any of the cores) |
|---|---|---|
| B | 1 | N |
| ... | ... | ... |
| B | 15 | 7 |
| C | 0 | 2 |
| ... | ... | ... |
| P | 0 | 15 |
| ... | ... | ... |
| P | 15 | N |

Finally, by inverting the roles of index and contents from Table 4, an array 460 expressing to which application task ID# each given core of the fabric 110 got assigned, per Table 5 below, is formed. Specifically, Table 5 is formed by using as its index the contents of Table 4 i.e. the core ID numbers (other than those marked 'N'), and as its contents the application task ID index from Table 4 corresponding each core ID#:

TABLE 5

| Core ID index | Application ID | Task ID (within the application of column to the left) |
|---|---|---|
| 0 | P | 0 |
| 1 | B | 0 |
| 2 | B | 8 |
| ... | ... | ... |
| 15 | N | 1 |

Regarding Tables 4 and 5 above, note that the symbolic application IDs (A through P) used here for clarity will in digital logic implementation map into numeric representations, e.g. in the range from 0 through 15. Also, the notes per Tables 1-3 above regarding the implicit indexing (i.e., core IDs for any given application ID entry are given by the index of the given entry, eliminating the need to store the core IDs in this array) apply for the logic implementation of Tables 4 and 5 as well.

In hardware logic implementation the application and the intra-application task IDs of Table 5 can be bitfields of same digital entry at any given index of the array 460; the application ID bits can be the most significant bits (MSBs) and the task ID bits the least significant (LSBs), and together these, in at least one embodiment, form the start address of the active application task's address memory range in the memory array 450 (for the core with ID# equaling the given index to application task ID# array per Table 5).

By comparing Tables 4 and 5 above, it is seen that the information contents at Table 4 are the same as at Table 5; the difference in purposes between them is that while Table 5 gives for any core 120 its active application task ID#460 to process, Table 4 gives for any given application task its processing core 420 (if any at a given time). As seen from FIGS. 4-6, the Table 5 outputs are used to configure the core specific multiplexers 620 at XC 470, while the Table 4 outputs are used to configure the application task specific multiplexers 510 at XC 430.

Note further that, according to a particular embodiment of process 300, when the task to core placement module 330 gets an updated list of selected tasks 325 for one or more applications 220 (following a change in either or both of core to application allocations 315 or task priority lists 135 of one or more applications), it will be able to identify from Tables 4 and 5 the following:

I. The set of activating, to-be-mapped, applications tasks, i.e., application tasks within lists 325 not mapped to any core by the previous run of the placement algorithm 330. This set I. can be produced by taking those application tasks from the updated selected task lists 325 Table 4 whose core ID# was 'N' (indicating task not active) in the latest Table 4;

II. The set of deactivating application tasks, i.e., application tasks that were included in the previous, but not in the latest, selected task lists 325. This set II. can be produced by taking those application tasks from the latest Table 4 whose core ID# was not 'N' (indicating task active) but that were not included in the updated selected task lists 325; and III. The set of available cores, i.e., cores 120 which in the latest Table 5 were assigned to the set of deactivating tasks (set II. above).

The placer module 330, according to such particular embodiment, will use the above info to map the active tasks to cores of the array in a manner that keeps all the continuing tasks executing on their present cores, thereby maximizing utilization of the core array 115 for processing the (revenue generating) user applications 220. Specifically, in one such embodiment, the placement algorithm 330 maps the individual tasks 240 within the set I. of activating tasks in their increasing application task ID# order for processing at core instances within the set III. of available cores in their increasing core ID# order.

In alternative embodiments, the allocation 310 stage of the process 300 can, in addition to determining the number of cores from the array 115 to be allocated for each given application 220, determine also the subsets of specific cores instances assigned for the individual applications, and pass that core to application assignment info along to the remaining, including task placement 330, stages of the process 300. In such alternative embodiments, the stage 310 is to keep track of the available core instances than can be reallocated between applications, while the remaining stages of the process (incl. task to core placement) can be done completely independently, e.g. in parallel (incl. concurrently), for each application among the set 210.

Use-Case Scenarios and Benefits

According to the foregoing, the invention allows efficiently sharing a multi-core based computing hardware among a number of application software programs, each executing on a time variable number of cores, maximizing the whole system data processing throughput, while providing deterministic minimum system processing capacity access levels for each one of the applications configured to run on the given system.

Besides having the algorithm that allocates the system cores among the applications to ensure that each application gets at least up to the lesser of its CDF and its (e.g. contract based) entitled quota worth of cores on each run of the algorithm, in certain embodiments of the invention, the applications are given credits based on their CDFs (as used by allocation algorithm runs) that were less than their entitlements. For instance, a user application can be given discounts on its utility computing contract as a function of how much less the application's average CDFs on contract periods (e.g., a day) were compared to the application's contract based entitlement of system's core capacity.

As an example, if a user applications' average CDFs were p % (p=0 to 100) less than the application's contract-based minimum system core access entitlement, the user can be given a discount of e.g. 0.25-times-p % its contract price for the period in question. Further embodiments can vary this discount factor D (0.25 in above example) depending e.g. on history based or predicted average busyness of the applications on the system during the discount assessment period (e.g. one hour period of the contract) in question, causing D to vary for instance in the range from 0.1 to 0.9.

Moreover, the utility computing system operator can offer client computing capacity service contracts with non-uniform discount factor D time profiles, e.g., in a manner to make the contract pricing more attractive to specific type of customer applications with predictable busyness time profiles, and consequently seek to combine contracts 220 with non-overlapping D profile peaks (time periods with high discount factor) into shared compute hardware 100, 110 capacity pools. Such arrangement can lead both to improving the revenues from the compute hardware capacity pool to the utility computing service provider, as well improving the application program performance and throughput volume achieved for each of the customers running their applications 220 on the shared multi-core system 100. Generally, offering contracts to the users sharing the system so that the peaks of the D profiles are minimally overlapping can facilitate spreading the user application processing loads on the given system 100 more evenly over time, and thus lead to maximizing both the system utilization efficiency as well as the performance (per given cost budget) experienced by each individual user application sharing the system.

In further embodiments, the contract pricing (e.g., for an entitlement up to four of the sixteen cores in the system whenever the application so demands) can vary from one contract pricing period to another e.g. on hourly basis (to reflect the relative expected or average busyness of the contract billing periods during a contract term), while in such scenarios the discount factor D can remain constant.

Generally, goals for such discounting methods can include providing incentives for the users of the system to balance their application processing loads for the system more evenly over periods of time such as hours within a day, days within a week and month of year etc. (i.e., seeking to avoid both periods of system overload as well as system under-utilization), and providing a greater average volume of surplus cores within the system (i.e. cores that applications could have demanded within their entitlements, but some of which did not demand for a given run of the allocation algorithm) that can be allocated in a fully demand adaptive manner among those of the applications that can actually utilize such cores beyond their entitled quota of cores, for faster, more parallelized execution of their tasks. Note that, according to these embodiments, the cores that an application gets allocated to it beyond its entitlement do not cost the user anything extra.

Accordingly, the system per FIG. 1 (and as further detailed per FIGS. 2-7 and related descriptions), in particular when combined with pricing discount factor techniques per above, enables maximizing the overall utility computing cost-efficiency.

Moreover, the fabric network 400 (described in relation to FIGS. 4-7) enables running any application task on the system at any of its cores at any given time, in a restriction free manner, with minimized overhead, including minimized core idle times, and without a need for a collective operating system software during the system runtime operation (i.e., after its startup or maintenance configuration periods) to handle matters such monitoring, prioritizing, scheduling, placing and policing user applications and their tasks. According to the described embodiments of the invention, the fabric network achieves this optimally flexible use of the cores of the system in both software and hardware implementation efficient manner (including logic and wiring resource efficiently), without a need for either application to application, task to task, or core to core level cross-connectivity, as well as memory efficiently without a need for the cores to hold more than one task's image within their memories at a time. Instead of needing application task to task or core to core cross-connects for inter-task communications and/or memory image transfers, the invention achieves their purposes by more efficiently (in terms of system resources needed) through a set of multiplexers connecting the cores to application task specific segments at the fabric memory. The invention thereby enables application tasks running on any core of the fabric to communicate with any other task of the given application without requiring any such communicating task to know whether and where (at which core) the other tasks are running at any given time. The invention thus provides architecturally improved scalability for parallel data processing systems as the number of cores, applications and tasks within applications grows. To summarize, the invention enables each application program to dynamically get a maximized number of cores that it can utilize in parallel so long as such demand-driven core allocation allows all applications on the system to get at least up to their entitled number of cores whenever their processing load actually so demands.

It is further seen that the invented data processing systems and methods enable dynamically optimizing the allocation of its parallel processing capacity among a number of concurrently running application software programs, in a manner that is adaptive to realtime processing loads offered by the applications, with minimized system (hardware and software) overhead costs.

Accordingly, a listing of benefits of the invented, application load adaptive, minimized overhead multi-user data processing system includes:

- Practically all the application processing time of all the cores across the system is made available to the user applications, as there is no need for a common system software to run on the system (e.g. to perform in the cores traditional operating system tasks such as time tick processing, serving interrupts, scheduling and placing applications and their tasks to the cores.
- The application programs do not experience any considerable delays in ever waiting access to their (e.g. contract-based) entitled share of the system's processing capacity, as any number of the processing applications configured for the system can run on the system concurrently, with a dynamically optimized number of parallel cores allocated per an application.
- The allocation of the processing time across all the cores of the system among the application programs sharing the system is adaptive to the realtime processing loads of these applications.
- There is inherent security (including, where desired, isolation) between the individual processing applications in the system, as each application resides in its dedicated (logical) segment of the system memory, and can safely use the shared processing system effectively as if it was the sole application running on it. This hardware based security among the application programs and tasks sharing a multi-core data processing system per the invention further facilitates more straightforward, cost-efficient and faster development and testing of applications and tasks to run on such systems, as undesired interactions between the different user application programs can be disabled already at the system hardware level.

The invention thus enables maximizing the data processing throughput across all the processing applications configured to run on the shared multi-core computing system.

The hardware based scheduling and context switching of the invented system accordingly ensures that any given application gets at least its entitled share of the shared parallel processing system capacity whenever the given processing application actually is able to utilize at least its entitled quota of system capacity, and as much processing capacity beyond its entitled quota as is possible without blocking the access to the entitled and fair share of the processing capacity by any other application program that is actually able at that time to utilize such capacity that it is entitled to. For instance, the invention thus enables any given user application to get access to the full processing capacity of the multi-core system whenever the given application is the sole application offering processing load for the shared multi-core system. In effect, the invention provides for each user application assured access to its contract based percentage (e.g. 10%) of the multi-core system throughput capacity, plus most of the time much greater share, even 100%, of the processing system throughput capacity, with the cost base for any given user application being largely defined by only its committed access percentage worth of the shared multi-core processing system costs.

The references [1], [2], [3] and [4] provide further reference specifications and use cases for aspects and embodiments of the invented techniques.

CONCLUSIONS

This description and drawings are included to illustrate architecture and operation of practical embodiments of the invention, but are not meant to limit the scope of the invention. For instance, even though the description does specify certain system parameters to certain types and values, persons of skill in the art will realize, in view of this description, that any design utilizing the architectural or operational principles of the disclosed systems and methods, with any set of practical types and values for the system parameters, is within the scope of the invention. For instance, in view of this description, persons of skill in the art will understand that the disclosed architecture sets no actual limit for the number of cores in a given system, or for the maximum number of applications or tasks to execute concurrently. Moreover, the system elements and process steps, though shown as distinct to clarify the illustration and the description, can in various embodiments be merged or combined with other elements, or further subdivided and rearranged, etc., without departing from the spirit and scope of the invention. It will also be obvious to implement the systems and methods disclosed herein using various combinations of software and hardware. Finally, persons of skill in the art will realize that various embodiments of the invention can use different nomenclature and terminology to describe the system elements, process phases etc. technical concepts in their respective implementations. Generally, from this description many variants will be understood by one skilled in the art that are yet encompassed by the spirit and scope of the invention.

What is claimed is:

1. A digital hardware logic system for exchanging information between an array of processing cores for processing a set of data processing tasks and task-specific memory segments, the system comprising:

a first set of multiplexers, wherein each multiplexer of the first set of multiplexers is specific to one of the task-specific memory segments;

a second set of multiplexers, wherein each multiplexer of the second set of multiplexers is specific to one of the processing cores of the array; and a hardware logic module, referred to as a controller, which is configured to periodically, for each of the processing cores in the array of processing cores, assign an individual data processing task of said set of data processing tasks for processing, provide input selection configuration for at least one multiplexer among said first set of multiplexers, and provide input selection configuration for at least one multiplexer among said second set of multiplexers.

2. The system of claim 1, wherein the input selection configurations provided by the controller comprise an identification of: i) for the first set of multiplexers, a processing core within the array of processing cores assigned to process a given data processing task among said set of data processing tasks, and ii) for the second set of multiplexers, a data processing task among said set of data processing tasks that is mapped to a given processing core of the array of processing cores for processing.

3. The system of claim 1 configured to transfer: i) memory images of data processing tasks of said set of data processing tasks between memories of processing cores of the array of processing cores and the task-specific memory segments, or ii) inter-task communication among at least some data processing tasks of said set of data processing tasks.

4. The system of claim 1, wherein the controller further comprises hardware logic subsystem that, in preparation of assigning the cores, is configured to periodically, once for each successive core allocation period (CAP), execute an algorithm allocating the array of processing cores among the data processing tasks, said subsystem comprising:

(i) a piece of logic configured to carry out a first round of the algorithm, by which a subset of the processing cores are allocated among the data processing tasks so that any actually materialized demands for the processing cores by each of the data processing tasks up to their respective entitled shares of the processing cores are met;

(ii) a piece of logic configured to carry out a second round of the algorithm, by which any of the processing cores that remain unallocated after the first round are allocated among the data processing tasks whose materialized demands for the processing cores had not been met by amounts of the processing cores so far allocated to them by the present invocation of the algorithm; and (iii) a piece of logic configured to carry out a third round of the algorithm, by which any of the processing cores that remain unallocated after the second round are allocated among the data processing tasks, wherein the materialized demand for the processing cores by a given one of the data processing tasks is expressed as a number of schedulable instances that the given data processing task has ready for execution for a CAP following a present invocation of the algorithm.

5. A method for exchanging information between memories at a multi-core data processing fabric, the fabric comprising a) an array of processing cores for processing a set of data processing tasks, b) task-specific segments at a fabric memory, c) a first set of multiplexers, wherein each multiplexer of the first set of multiplexers is specific to one of the task-specific segments at the fabric memory and d) a second set of multiplexers, wherein each multiplexer of the second set of multiplexers is specific to one of the processing cores of the array of processing cores, the method comprising:

periodically, for each of the processing cores of the array of processing cores, assigning an individual data processing task of said set of data processing tasks for processing; and responsive to said assigning, configuring at least one multiplexer among said first set of multiplexers with input selection configuration, and configuring at least one multiplexer among said second set of multiplexers with input selection configuration.

6. The method of claim 5, wherein the input selection configurations provided by the controller comprise an identification of: i) for the first set of multiplexers, a processing core within the array of processing cores assigned to process a given data processing task among said set of data processing tasks, and ii) for the second set of multiplexers, a data processing task among said set of data processing tasks that is mapped to a given processing core of the array of processing cores for processing.

7. The method of claim 5, further comprising: transferring, under the control of said configuring, memory images of data processing tasks of said set of data processing tasks between memories of processing cores of the array of processing cores and the task-specific segments at the fabric memory.

8. The method of claim 5, further comprising: transferring, under the control of said configuring, inter-task communication among at least some data processing tasks of said set of data processing tasks.

9. The method of claim 5, wherein the step of assigning is done following a step of allocating the array of processing cores among the set of data processing tasks for successive core allocation periods (CAPs), said allocating comprising:

(i) initially, a subset of the processing cores are allocated among the data processing tasks so that any actually materialized demands for the processing cores by each of the data processing tasks up to their respective entitled shares of the processing cores are met;

(ii) following step (i), any of the processing cores that remain unallocated are allocated among the data processing tasks whose materialized demands for the processing cores had not been met by amounts of the processing cores so far allocated to them by the present exercising of the method; and (iii) following step (ii), any of the processing cores that remain unallocated are allocated among the data processing tasks, wherein the materialized demand for the processing cores by a given one of the data processing tasks corresponds to a number of schedulable instances that the given data processing task has ready for execution for the CAP following a present exercising of the method.

\* \* \* \* \*